United States Patent
Nilsson

(10) Patent No.: US 7,498,974 B2
(45) Date of Patent: Mar. 3, 2009

(54) RADAR LEVEL GAUGE WITH A GALVANICALLY ISOLATED INTERFACE

(75) Inventor: Valter Nilsson, Hovås (SE)

(73) Assignee: Rosemount Tank Radar AB, Gothenburg (SE)

( * ) Notice: Subject to any disclaimer, the term of this patent is extended or adjusted under 35 U.S.C. 154(b) by 0 days.

(21) Appl. No.: 11/525,004

(22) Filed: Sep. 21, 2006

(65) Prior Publication Data

US 2008/0074309 A1  Mar. 27, 2008

(51) Int. Cl.
*G01F 23/284* (2006.01)
*G01S 13/08* (2006.01)
*G01S 13/00* (2006.01)

(52) U.S. Cl. .......... 342/124; 342/89; 342/118; 342/175; 342/195; 342/198; 73/290 R; 324/600; 324/629; 324/637; 324/642; 324/644

(58) Field of Classification Search .......... 342/82, 342/89, 118, 120–124, 175, 198; 73/290 R, 73/304 R, 304 C; 324/629, 637, 642, 644, 324/600; 713/300
See application file for complete search history.

(56) References Cited

U.S. PATENT DOCUMENTS

| | | | | |
|---|---|---|---|---|
| 5,365,178 A * | 11/1994 | Van Der Pol | | 324/644 |
| 5,416,723 A * | 5/1995 | Zyl | | 713/300 |
| 5,672,975 A * | 9/1997 | Kielb et al. | | 324/644 |
| 5,847,567 A * | 12/1998 | Kielb et al. | | 324/642 |
| 6,014,100 A * | 1/2000 | Fehrenbach et al. | | 342/124 |
| 6,320,532 B1 * | 11/2001 | Diede | | 342/124 |
| 6,373,261 B1 * | 4/2002 | Kielb et al. | | 324/644 |
| 6,750,808 B2 | 6/2004 | Faust | | 342/124 |
| 6,765,524 B2 * | 7/2004 | Kleman | | 342/124 |
| 6,922,150 B2 * | 7/2005 | Håll et al. | | 73/290 R |
| 6,956,382 B2 * | 10/2005 | Nilsson | | 324/644 |
| 7,227,495 B2 * | 6/2007 | Bletz et al. | | 342/124 |
| 2002/0135508 A1 * | 9/2002 | Kleman | | 342/124 |
| 2003/0154783 A1 * | 8/2003 | Koernle | | 73/290 R |
| 2004/0100281 A1 * | 5/2004 | Nilsson | | 324/644 |

OTHER PUBLICATIONS

T. Crews, "Intrinsic Safety: What does 'intrinsically safe' mean?"; posted on the Internet at ruggedpcreview.com; no date given.*
Internet page from omega.com, the website for Omega Engineering, on the subject of intrinsic safety; no author given; no date given.*
"Shunt-Diode Safety Barriers and Galvanic Isolators-a Critical Comparison" by L C Towle BSc CEng MIMechE MIEE MinstMC, Jun. 1996, 17 pages.

* cited by examiner

*Primary Examiner*—Bernarr E Gregory
(74) *Attorney, Agent, or Firm*—Westman, Champlin & Kelly, P.A.

(57) ABSTRACT

A radar level gauge (RLG) using electromagnetic waves for determining a process variable of a product in a tank is provided which includes timing circuitry adapted to provide timing control of a transceiver, and a communication interface arranged to receive power in an intrinsically safe manner and to connect the radar level gauge externally thereof. The RLG further comprises an isolation interface arranged to galvanically isolate the transceiver from the timing circuitry and the communication interface, the isolation interface being arranged to transfer power and timing control from the timing circuitry and the communication interface to the transceiver circuitry.

14 Claims, 3 Drawing Sheets

RADAR LEVEL GAUGE WITH A GALVANICALLY ISOLATED INTERFACE

FIELD OF THE INVENTION

The present invention relates to a radar level gauge system using electromagnetic waves for measuring a level of a surface of a product in a container. More specifically, the present invention relates to a radar level gauge with a galvanically isolating interface.

BACKGROUND OF THE INVENTION

Radar level gauges (RLGs) are suitably used for making non-contact measurements of the level of products such as process fluids, granular compounds and other materials. An example of such a radar level gauge can include a transceiver for transmitting and receiving microwaves, a propagation device arranged to direct microwaves towards the surface and to return microwaves reflected by the surface to the transceiver, timing circuitry adapted to control the transceiver and to determine the level based on a relation between microwaves transmitted and received by the transceiver and an interface arranged to receive power and to connect the radar level gauge externally thereof.

In a case where measurements are made in a tank containing explosive gas or liquids, or in any other situation where the radar level gauge is located in an explosion endangered area, it is required that the RLG is provided with explosion protection. This requirement can be fulfilled using an intrinsically safe (IS) design, in which a barrier is used to limit voltages, current and power supplied to the RLG. Such a barrier is generally placed at the input to the communication interface, thus protecting the complete system.

The propagation device, for example an antenna or a guided wave probe (i.e. transmission line suspended from top to bottom in the tank), also requires a ground reference. A problem in this context is that the RLG will also be connected to a ground reference through the communication interface, and a ground loop circuit can develop when the different ground references are tied to different potentials. Such a ground loop may add or subtract current or voltage from the measurement process, possibly distorting the measurement signal.

In order to avoid interference, disturbance or malfunction from multiple grounding, capacitors can be used to prevent DC current and the low frequency communication signal from interfering with the measurement signal. If the propagation device is operated at high frequency (e.g. microwaves) such capacitors can effectively disconnect the propagation device from the communication circuitry, avoiding problems associated with ground loops. An example of such a system is disclosed in U.S. Pat. No. 6,750,808.

However, separating the propagation device by means of capacitors can be a complex solution, especially when transmitting an unmodulated pulse, as often is the case when using guided wave radar. The reason is that the transmitted pulse in this case has a broad bandwidth, which cannot easily be separated from the communication signal. In addition, the total amount of capacitance in the RLG is limited due to intrinsic safety requirements.

When the propagation device is a free propagating antenna, the antenna is normally galvanically separated from the circuitry by means of an isolated feeder connected to a wave guide, and ground loops are thus not an issue. However, the issue of limited capacitance is still a problem.

In order to obtain a satisfactory signal to noise ratio, it is desirable to transmit electromagnetic signals with high power. In order to transmit waves of higher power in a situation when the available power is limited, such as when using a two-wire interface, the transceiver may use capacitors as energy storage to temporarily provide a greater power level. However, the total amount of capacitance in an intrinsically safe circuit is limited, thus potentially limiting the sensibility of the RLG.

GENERAL DISCLOSURE OF THE INVENTION

There is therefore a need for an improved radar level gauge, overcoming or mitigating at least some of the problems above.

According to one aspect of the present invention, this is accomplished by a radar level gauge using electromagnetic waves for determining a process variable of a product in a tank, comprising transceiver circuitry for transmitting and receiving electromagnetic waves, a propagation device connected to the transceiver circuitry and arranged to direct electromagnetic waves towards a surface of the product and to return electromagnetic waves reflected by the surface, timing circuitry adapted to provide a timing control of the transceiver circuitry, processing circuitry connected to the transceiver and adapted to determine the process variable based on a relation between transmitted and reflected waves, a communication interface arranged to receive power in an intrinsically safe manner and to connect the radar level gauge externally thereof, and an isolation interface arranged to galvanically isolate said transceiver circuitry from the timing circuitry and the communication interface, the isolation interface being arranged to transfer power and timing control from the timing circuitry and the communication interface to said transceiver circuitry.

According to this design, the galvanic isolation splits the radar level gauge system internally into two circuits, with no conductive connection there between. Any potential ground loops between the transceiver and the communication interface are thus effectively avoided.

Further, as the RLG is divided into two galvanically isolated circuits, each circuit can be designed individually to fulfill the relevant IS standard. This means that the total capacitance allowed in the transceiver circuitry will not be limited by the any capacitance present in the rest of the RLG, such as in the communication interface. As a consequence, there will more capacitance available in the transceiver for energy storage purposes, used e.g. for temporarily increasing transmission power.

It will further be possible to allow the two circuits to belong to different IS categories. For example, the second circuit, comprising the transceiver circuitry and being connected to the propagation device in the tank, may have a stricter IS classification (e.g. IS category 'ia'), than the first circuit (e.g. IS category 'ib').

As it in general is difficult to communicate high frequency signals over a galvanically isolated interface, the placement of the isolation interface may be governed by the high frequency and low frequency sections in the radar level gauge system. This is typically the case in a modulated system, where each pulse is modulated by a GHz carrier wave.

Furthermore, the isolation interface is preferably placed such that a galvanic energy transfer between the sections is achieved at a voltage level that is as low as possible.

The isolation interface can further be arranged to galvanically isolate the transceiver circuitry from the processing circuitry and to provide communication between the transceiver circuitry and the processing circuitry. In this case, the transceiver circuitry is thus galvanically isolated from both the timing circuitry and the processing circuitry.

In this case, the transceiver circuitry is preferably adapted to generate an analogue tank signal based on transmitted and reflected waves. The isolation interface can then be adapted to communicate this analogue tank signal from the transceiver circuitry to the processing circuitry. Such analogue communication may be realized e.g. by a servo connected optocoupler. An advantage of this design is that the A/D conversion of the tank signal, which requires additional power, does not take place in the galvanically isolated transceiver.

Alternatively, the transceiver circuitry generates a digital tank signal and the isolation interface is adapted to communicate this digital tank signal from the transceiver to the processing circuitry. Such digital communication is very easy to realize, e.g. using an optocoupler.

The isolation interface can further comprise at least one transformer for transferring power across the isolation interface to power the transceiver circuitry. A transformer can be an advantageous way to secure transfer of power across a galvanically isolating interface. The timing control can then be based on information contained in a waveform of a current flowing through the transformer. For example, the timing control can be based on polarity changes or on flank positions in the current.

The communication interface can be a two-wire interface, arranged both to transmit measurement data to a remote location and to receive power for operation of the radar level gauge using only two wires. For example, the interface can be a 4-20 mA industrial loop, possibly with superimposed digital communication (HART), a Fieldbus Foundation bus, or a Profibus. Such loops are widely used to power radar level gauges. Alternatively, the interface can be a four-wire interface.

The process of transmitting the measurement data to the remote location is preferably achieved by further including a current control unit with the radar level gauge, wherein the current control unit is adapted to regulate the current in the two-wire interface in accordance with the measured level.

The propagation device can comprise at least one of a probe for guided wave transmission of the electromagnetic waves, an antenna for free propagation of the electromagnetic waves, and a hollow waveguide for guided propagation of the electromagnetic waves. It is accordingly possible to select the type of propagation device according to the environment in which the radar level gauge is installed.

The transceiver circuitry can be adapted to transmit pulse modulated signals (e.g. pulsed radar level gauging) or frequency modulated signals (e.g. Frequency Modulated Continuous Wave, FMCW).

In this latter case, the timing circuitry can be adapted to provide a timing schedule for each frequency sweep, e.g. start and stop times for a frequency ramp performed by the transceiver circuitry.

BRIEF DESCRIPTION OF THE DRAWINGS

This and other aspects of the present invention will now be described in more detail, with reference to the appended drawings showing a currently preferred embodiment of the invention.

DETAILED DESCRIPTION OF PREFERRED EMBODIMENTS

Figure 1:
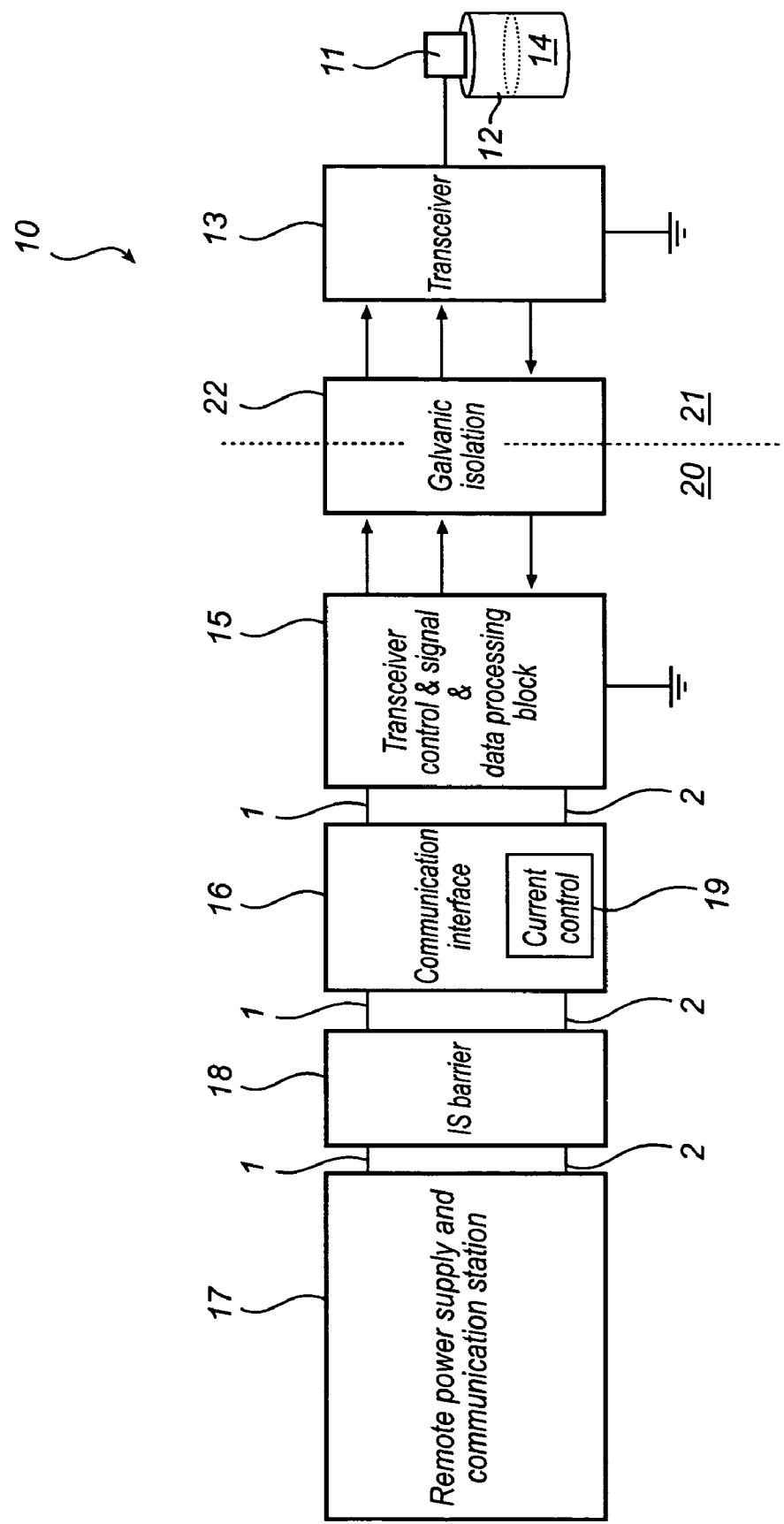
FIG. 1 illustrates a generalized schematic block diagram of a radar level gauge in which the present invention can be implemented.

FIG. 1 shows a generalized schematic block diagram of a radar level gauge system 10 according to an embodiment of the present invention. A more detailed description of selected parts of the radar level gauge system 10 will be described below in relation to FIG. 2. The system 10 is arranged to perform measurements of a process variable such as the level of an interface between two materials in a tank 12. Typically, the first material is a liquid stored in the tank, e.g. gasoline, while the second material is air.

Figure 2:
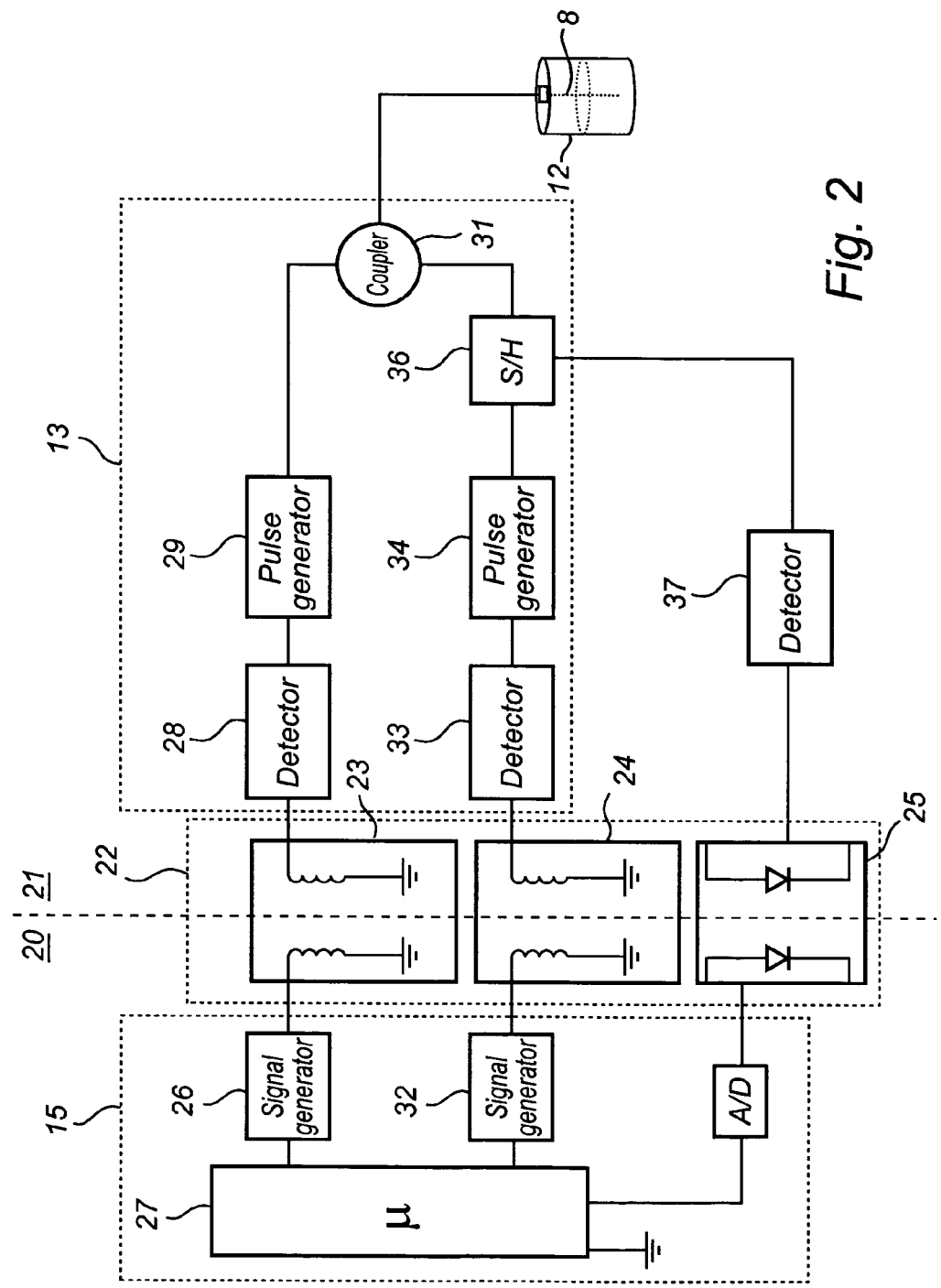
FIG. 2 illustrates a detailed functional block diagram of selected parts from FIG. 1, in the case of an unmodulated system.
Figure 3:
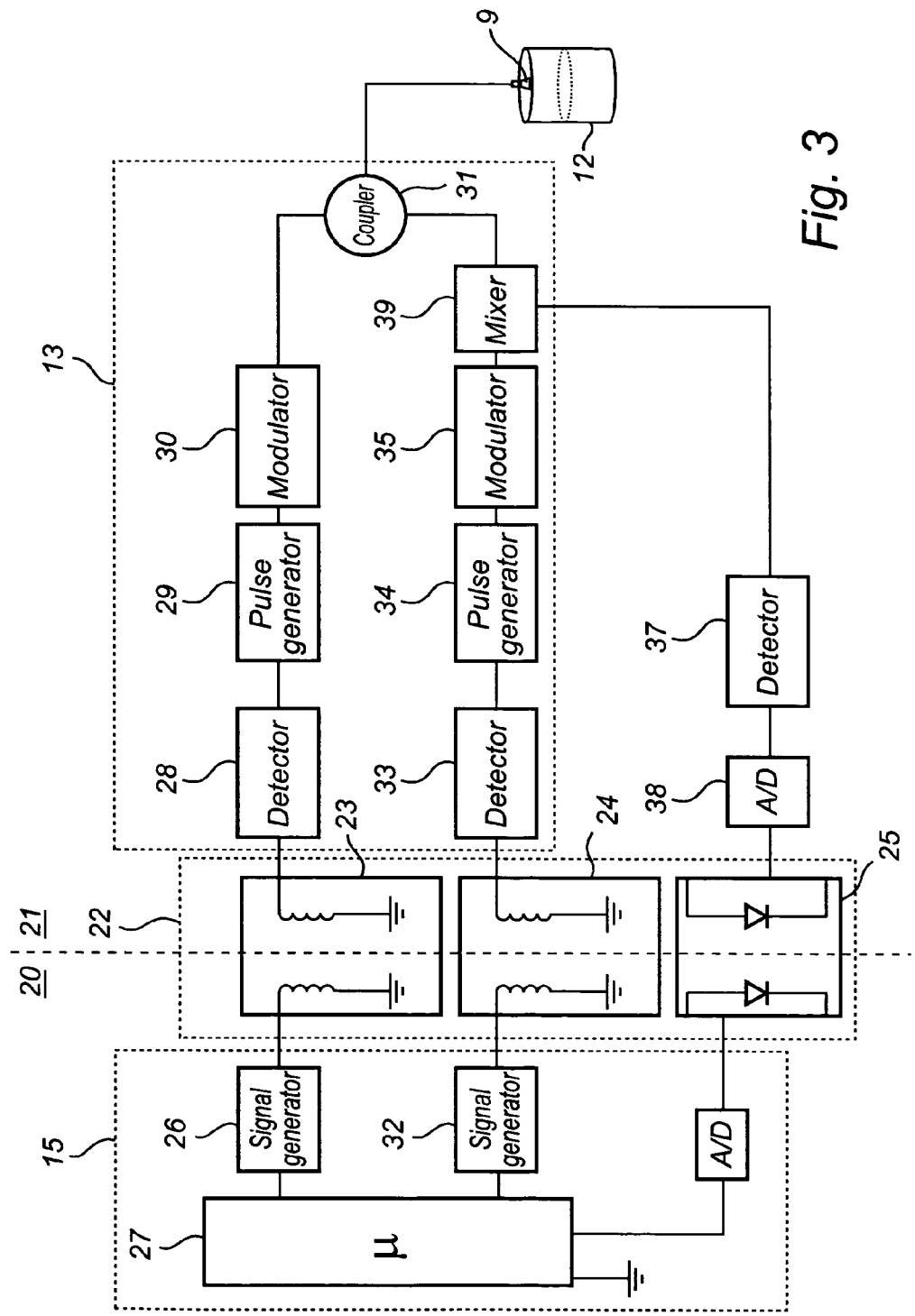
FIG. 3 illustrates a detailed functional block diagram of selected parts from FIG. 1, in the case of a modulated system.

The radar level gauge system 10 includes a propagation device 11 extending into the tank 12, and connected to transceiver circuitry 13. The propagation device 11 is arranged to act as an adapter, transmitting electromagnetic waves into the tank 12 to be reflected by a surface of a product 14 in the tank. The propagation device 11 can be a guided wave transmission line 8 as illustrated in FIG. 2. Such a transmission line can be a flexible wire suspended between top and bottom of the tank, or can be a rigid probe extending into the tank. It can be a single wire, twin wire, coaxial, or any other type of suitable transmission line. Alternatively, the propagation device can be a free propagating antenna 9, arranged in the top of the tank, as illustrated in FIG. 3. In this case, the transmitted signal must be a microwave signal, e.g. a modulated pulse.

The radar level gauge system 10 also includes timing circuitry and processing circuitry, here illustrated as a transceiver control and signal processing block 15, adapted to control the transceiver circuitry 13 and to determine a process variable of the product 14 in the tank 12, based on a relation between waves transmitted and received by the transceiver 13.

The transceiver control and signal processing block 15 is further connected to a communication interface 16 which is adapted to provide communication externally of the radar level gauge 10, and also arranged to receive power for the radar level gauge 10. In the illustrated embodiment, the communication between the communication interface 16 and a control station 17 is provided by a two-wire interface comprising two lines 1, 2, which has a combined function of both transmitting the measurement result to the control station 17 and for receiving power for operation of the radar level gauge system 10. A current control unit 19 is arranged in the communication interface to regulate the current in the lines 1, 2, in accordance with a measurement result determined by the data processing block 15.

An example of such a two-wire connection, at the same time providing drive power and communicating a measurement signal, is a 4-20 mA industrial loop. However, a person skilled in the art realizes that other types of communication protocols might be used, such as for example a four-wire connection in which case the power supply to the radar level gauge 10 is supplied through two of the four wires, and the communication is provided through the remaining two wires.

Due to the environment in which the radar level gauge system 10 generally is used, it is often necessary to provide the power and communication in an intrinsically safe (IS) manner. For this purpose, an IS barrier 18 between the lines 1, 2 ensures that the radar level gauge system 10 is intrinsically safe, i.e. that power, current and voltage are kept below given limits, reducing the risk of hazard.

The intrinsic safety IEC standard utilizes three levels of protection, 'ia', 'ib' and 'ic', which attempt to balance the probability of an explosive atmosphere being present against the probability of an ignition capable situation occurring. The level 'ia' offers the highest level of protection and is generally considered as being adequately safe for use in the most hazardous locations (Zone 0) because the possibility of two 'faults' and a factor of safety of 1.5 is considered in the assessment of safety. The level 'ib', which is adequately safe with one fault and a factor of safety of 1.5 is considered safe for use in less frequently hazardous areas (Zone 1), and the level 'ic' is assessed in 'normal operation' with a unity factor of safety is generally acceptable in infrequently hazardous areas (Zone 2). It is usual for a system to be allocated a level of protection as a whole, depending on the level of protection of the parts in the system. However it is possible for different parts of a system to have different levels of protection where suitable segregation exists. The galvanic intrinsic safety barrier described above provides such a suitable segregation.

According to an embodiment of the invention, the radar level gauge system 10 is equipped with an isolation interface 22 providing galvanic isolation. The interface 22 divides the RLG 10 in two circuits 20, 21, wherein the first circuit 20 comprises the block 15 and the interface 16, and the second circuit 21 comprises the transceiver circuitry 13 and the propagation device 11. The interface 22 thus eliminates unwanted ground loops, which may otherwise occur due to different ground references in the propagation device 11 and the communication interface 16, respectively.

A further description of the functionality of the galvanically isolating interface 22 is given with reference to FIG. 2. FIG. 2 shows a more detailed view of the transceiver control and signal processing block 15 and the transceiver 13 in the case of a guided wave radar system using transmission of DC pulses. Elements having similar structure and functionality as in FIG. 1 have been indicated with identical numerals.

In the illustrated embodiment, the galvanically isolating interface 22 comprises a first transformer 23, a second transformer 24, and an optocoupler 25.

The block 15 here comprises a controller 27. The controller 27 may include a microprocessor, microcontroller, programmable digital signal processor or another programmable device. The controller 27 may also, or instead, include an application specific integrated circuit, a programmable gate array programmable array logic, a programmable logic device, or a digital signal processor. Where the controller 27 includes a programmable device such as the microprocessor or microcontroller mentioned above, the processor may further include computer executable code that controls operation of the programmable device.

The controller provides a control signal to a first signal generator 26 for the transmitter side of the radar level gauge system 10. The signal generator 26 generates a signal with alternating polarity, such as a square wave or a sine wave, comprising an amount of electric energy and having a fixed and stable frequency possibly controlled by the controller 27. The signal is supplied to the primary side of the transformer 23, and is transferred to the secondary side of the transformer 23.

The entire RLG is provided with power via the communication interface 16. In the first circuit 20, the power can be supplied directly from the lines 1, 2. In the second circuit 21, energy must be tapped from the secondary sides of the transformers 23, 24. This energy is distributed in the transceiver circuitry 13 and used to power the various components described herein. The details of this power distribution will not be described in further detail.

A detector 28 is supplied with an alternating signal, possibly superposed on a DC signal. The detector is adapted to detect each time the signal crosses a predefined threshold, thereby detecting one or both of the rising and falling edges of the signal, and provides a pulse timing corresponding to this detection.

The pulse timing is supplied to a pulse generator 29. The pulse generator 29 is arranged to generate pulses with a length of about 2 ns or less, at average power levels in the nW or μW area. The pulses from the pulse generator 29 are fed to a directional coupler 31, adapted to direct the pulses from the pulse generator 29 to the propagation device 11 in the tank, e.g. the probe illustrated in FIG. 1, and to direct reflected signals from the probe back to a receiver side of the radar level gauge system 10.

The receiver side of the radar level gauge system 10 comprises a second transformer 24 for transferring power from a second signal generator 32 to a second detector 33. The second signal generator is controlled to provide a signal having a fixed and stable frequency slightly different from the frequency of the first signal generator 26. The second detector 33 is connected to a second pulse generator 34 and a sampling receiver 36, adapted to mix the signal received from the coupler 31 with a pulse train from the pulse generator 34. The output from the sampling receiver 36 is provided to a detector 37. The detector serves to rectify and integrate the sampled signal, and to output an analogue tank signal.

The analogue tank signal is supplied to the analogue optocoupler 25, adapted to communicate the tank signal across the isolation interface, where it is supplied to an A/D-converter 38. The A/D converter digitizes the tank signal, and then provides it to the controller 27. Of course, the A/D converter may be arranged on the transceiver side, and the optocoupler be adapted to communicate a digital signal.

In use, the controller 27 in the transceiver control and signal processing block 15 controls the pulse generator 29 in the transceiver 13, through the galvanically isolating interface 22, to transmit DC pulses which are guided into the tank by the propagation device 11. The transmitted pulses are reflected in the interior of the tank, e.g. against any surface interface between different contents, and are fed by the propagation device 11 back to the transceiver 13. Here, they are received by the sampling receiver 36, and the analogue tank signal is communicated across the isolation interface 22. The tank signal is then sampled and digitalized by A/D-converter 38 and processed by controller 27 to determine a measurement result based on a relation between the transmitted and received waves. The measurement result is then communicated externally of the RLG by the communication interface 16. In the case of a two-wire system, the current control unit 19 regulates a total current in the current loop such that it corresponds to the measurement result.

FIG. 3 corresponds to FIG. 2, but relates to a modulated system, where the pulse are modulated by a carrier frequency. Such modulation is required when the propagation device is a free propagating antenna 9, as in FIG. 3, but can also be used with a guided wave probe. Structures similar to those in FIG. 2 have been given identical reference numerals.

Compared to the system in FIG. 2, the system in FIG. 3 comprises two modulators 30, 35, arranged after the pulse generators 29 and 34. Further, the sampling receiver 36 is replaced with a mixer 39.

The function of the system is essentially the same as that describe in relation to FIG. 2, with the important exception that the transmitted pulses are modulated by a carrier wave in the GHz frequency range. In particular, the function of the isolation interface 22 is similar.

The person skilled in the art realizes that the present invention by no means is limited to the preferred embodiments described above. On the contrary, many modifications and variations are possible within the scope of the appended claims. For example, it is possible to include an optocoupler in the opposite direction, i.e. from the low frequency side to the high frequency side of the radar level gauge system, for providing control of components located on the galvanically isolated high frequency side of the radar level gauge system.

Although the invention here has been described primarily in relation to a pulsed RLG system, the invention is also applicable in a system transmitting a continuous signal with a frequency varying over a certain range (Frequency Modulated Continuous Wave, FMCW). IN this case, the timing control provided to the transceiver circuitry across the isolation interface will include start and stop times for each frequency sweep, thus controlling a frequency ramp in the transceiver. Although the details of the transceiver are different in such a system, the function of the isolation interface will be similar, and provide equivalent advantages.

What is claimed is:

1. A radar level gauge using electromagnetic waves for determining a process variable of a product in a tank, comprising:
    transceiver circuitry for transmitting and receiving electromagnetic waves;
    a propagation device connected to said transceiver circuitry and that directs electromagnetic waves towards a surface of said product and to return electromagnetic waves reflected by said surface;
    timing circuitry that provides timing control to said transceiver circuitry;
    processing circuitry connected to said transceiver circuitry that determines said process variable based on a relation between transmitted and reflected waves;
    a communication interface that receives power in an intrinsically safe manner and connects externally of said radar level gauge; and
    an isolation interface that galvanically isolates said transceiver circuitry from said timing circuitry and said communication interface,
        wherein said isolation interface transfers power and the timing control from said timing circuitry and said communication interface to said transceiver circuitry.

2. The radar level gauge according to claim 1, wherein said isolation interface further galvanically isolates said transceiver circuitry from said processing circuitry and provides communication between said transceiver circuitry and said processing circuitry.

3. The radar level gauge according to claim 2, wherein said transceiver circuitry generates an analogue tank signal based on transmitted and reflected waves, and wherein said isolation interface communicates said analogue tank signal from said transceiver circuitry to said processing circuitry.

4. The radar level gauge according to claim 2, wherein said transceiver circuitry generates a digital tank signal based on transmitted and reflected waves, and wherein said isolation interface communicates said digital tank signal from said transceiver circuitry to said processing circuitry.

5. The radar level gauge according to claim 1, wherein said isolation interface further comprises at least one transformer for transferring power across said isolation interface to power said transceiver circuitry.

6. The radar level gauge according to claim 5, wherein said isolation interface comprises a first transformer that transfers power across said isolation interface to power a transmitting side of said transceiver circuitry, and a second transformer that transfers power across said isolation interface to power a receiving side of said transceiver circuitry.

7. The radar level gauge according to claim 5, wherein said timing control is based on information contained in a waveform of a current flowing through said transformer.

8. The radar level gauge according to claim 7, wherein said timing control is based on polarity changes in said current.

9. The radar level gauge according to claim 7, wherein said timing control is based on at least one of positive and negative flanks in said current.

10. The radar level gauge according to claim 1, wherein said communication interface comprises two wires, and which transmits measurement data to a remote location and receives power for operation of said radar level gauge on said two wires.

11. The radar level gauge according to claim 10, further comprising a current control unit that regulates a current flowing in said communication interface in accordance with said measured level.

12. The radar level gauge according to claim 1, wherein said propagation device comprises at least one of a probe for guided wave transmission of said electromagnetic waves, an antenna for free propagation of said electromagnetic waves, and a hollow waveguide for guided propagation of said electromagnetic waves.

13. The radar level gauge according to claim 1, wherein said transceiver transmits a pulse modulated signal.

14. The radar level gauge according to claim 1, wherein said transceiver transmits a frequency modulated signal.

* * * * *

UNITED STATES PATENT AND TRADEMARK OFFICE
CERTIFICATE OF CORRECTION

PATENT NO.         : 7,498,974 B2
APPLICATION NO. : 11/525004
DATED              : March 3, 2009
INVENTOR(S)        : Valter Nilsson Page 1 of 1

It is certified that error appears in the above-identified patent and that said Letters Patent is hereby corrected as shown below:

"Assignee: Rosemount Tank Radar AB, Gothenburg (SE)"

Should be

--Assignee: Rosemount Tank Radar AB, Goteborg (SE)--

Signed and Sealed this

Twenty-third Day of June, 2009

JOHN DOLL
*Acting Director of the United States Patent and Trademark Office*